(12) United States Patent
Nefedov et al.

(10) Patent No.: US 10,331,898 B2
(45) Date of Patent: Jun. 25, 2019

(54) METHOD AND APPARATUS FOR POLICY ADAPTION BASED ON APPLICATION POLICY COMPLIANCE ANALYSIS

(71) Applicant: Nokia Technologies Oy, Espoo (FI)

(72) Inventors: Nikolai Nefedov, Gattikonestr (CH); Debmalya Biswas, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 49 days.

(21) Appl. No.: 15/176,811

(22) Filed: Jun. 8, 2016

(65) Prior Publication Data

US 2016/0292434 A1 Oct. 6, 2016

Related U.S. Application Data

(63) Continuation of application No. 13/435,437, filed on Mar. 30, 2012, now Pat. No. 9,378,390.

(51) Int. Cl.
*G06F 21/60* (2013.01)
*G06F 21/62* (2013.01)

(52) U.S. Cl.
CPC ............ *G06F 21/604* (2013.01); *G06F 21/62* (2013.01); *G06F 21/6218* (2013.01); *G06F 21/6245* (2013.01)

(58) Field of Classification Search
CPC ..... H04L 63/00; H04L 63/0853; H04L 63/10; H04L 63/102; H04L 63/107;

(Continued)

(56) References Cited

U.S. PATENT DOCUMENTS 7,647,622 B1 1/2010 Sobel et al.
7,809,667 B1 * 10/2010 Yehuda .................. G06F 21/52
706/47

(Continued)

FOREIGN PATENT DOCUMENTS

GB 2477837 A 8/2011

OTHER PUBLICATIONS

Notification of Transmittal of the International Search Report and the Written Opinion of the International Searching Authority, or the Declaration for corresponding International Application No. PCT/FI2013/050321, dated Aug. 21, 2013, 1 page.

(Continued)

*Primary Examiner* — Shanto Abedin
*Assistant Examiner* — Adrian Stoica
(74) *Attorney, Agent, or Firm* — Ditthavong & Steiner, P.C.

(57) ABSTRACT

An approach is provided for policy adaption based on application policy compliance analysis. The compliance platform processes and/or facilitates a processing of one or more policy compliance logs associated with at least one application to determine one or more policy compliance profiles associated with the at least one application. The compliance platform determines one or more contexts under which the at least one application operates. The compliance platform causes, at least in part, an association of the one or more policy compliance profiles with the one or more contexts. The compliance platform then processes and/or facilitates a processing of user contextual information, user application use information, or a combination thereof against the association, the one or more policy compliance profiles, the one or more contexts, or a combination thereof to determine one or more adaptions to one or more policies associated with the at least one application.

16 Claims, 12 Drawing Sheets

(58) Field of Classification Search
CPC ... H04L 63/123; H04L 63/1425; H04L 63/20; G06F 21/00; G06F 21/316; G06F 21/50; G06F 21/52; G06F 21/566; G06F 21/60; G06F 21/62; G06F 21/6209; G06F 21/6218; G06F 21/6245; G06F 21/629; G06F 21/604; H04W 12/00; H04W 12/02; H04W 12/08; H04W 12/10
See application file for complete search history.

(56) References Cited

U.S. PATENT DOCUMENTS

| | | | |
|---|---|---|---|
| 2005/0108578 | A1 | 5/2005 | Tajalli et al. |
| 2006/0190985 | A1* | 8/2006 | Vasishth ............... G06F 21/604 726/1 |
| 2007/0294209 | A1* | 12/2007 | Strub ................... H04L 63/102 |
| 2009/0300712 | A1* | 12/2009 | Kaufmann .............. G06F 21/10 726/1 |
| 2010/0036779 | A1 | 2/2010 | Sadeh-Koniecpol et al. |
| 2010/0064341 | A1 | 3/2010 | Aldera |
| 2010/0077484 | A1 | 3/2010 | Paretti et al. |
| 2010/0317336 | A1 | 12/2010 | Ferren et al. |
| 2011/0145920 | A1* | 6/2011 | Mahaffey ............... G06F 21/564 726/22 |

OTHER PUBLICATIONS

International Search Report for corresponding International Application No. PCT/FI2013/050321, dated Aug. 21, 2013, 4 pages.
Written Opinion for corresponding International Application No. PCT/FI2013/050321, dated Aug. 21, 2013, 8 pages.

\* cited by examiner

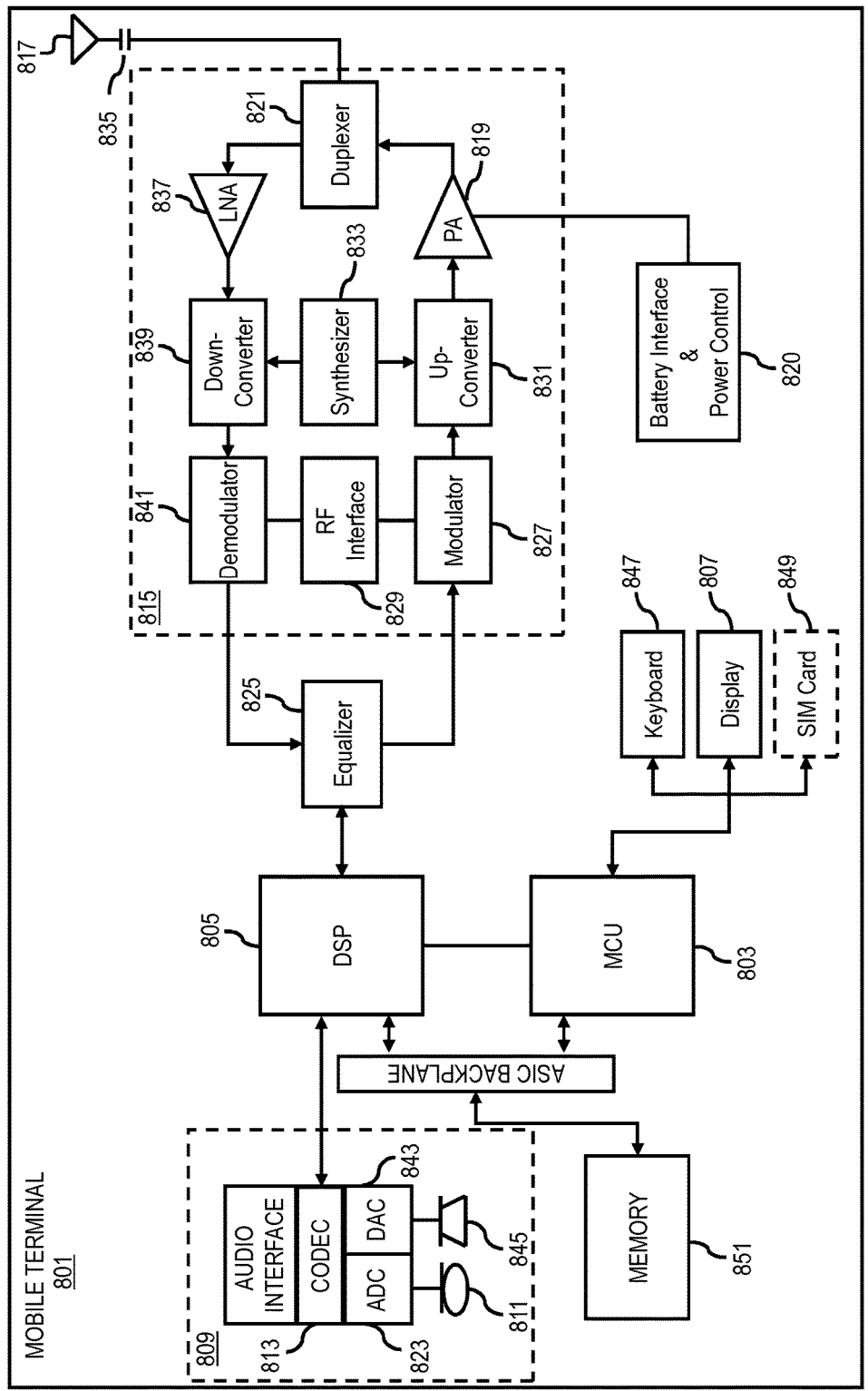

METHOD AND APPARATUS FOR POLICY ADAPTION BASED ON APPLICATION POLICY COMPLIANCE ANALYSIS

CROSS-REFERENCE TO RELATED APPLICATIONS

This application is a continuation of and claims the priority benefit under 35 U.S.C. § 120 to U.S. patent application Ser. No. 13/435,437, filed Mar. 30, 2012, titled "METHOD AND APPARATUS FOR POLICY ADAPTION BASED ON APPLICATION POLICY COMPLIANCE ANALYSIS," the entire disclosure of which is hereby incorporated by reference in its entirety for all purposes.

BACKGROUND

Service providers and device manufacturers (e.g., wireless, cellular, etc.) are continually challenged to deliver value and convenience to consumers by, for example, providing compelling network services. One area of interest has been the development of services and technologies for adapting policies for data usage control. For example, in recent years, the prevalence of smartphones has led to an ever increasing amount of personal user data being collected by the mobile devices, applications, service providers, etc. Resource access policies (e.g., privacy policy), for instance, may be initially selected by a user at a user device to ensure that collected personal data will only be utilized in certain ways or for particular purposes. However, as users desire different policy settings for various applications in an ongoing basis, it becomes tedious and complicated for the users to manually select or change these settings for applications. Some Example Embodiments Therefore, there is a need for an approach for automatically adapting policies for applications based on user context, preferences, etc. after application installation.

According to one embodiment, a method comprises processing and/or facilitating a processing of one or more policy compliance logs associated with at least one application to determine one or more policy compliance profiles associated with the at least one application. The method also comprises determining one or more contexts under which the at least one application operates. The method further comprises causing, at least in part, an association of the one or more policy compliance profiles with the one or more contexts. The method further comprises processing and/or facilitating a processing of user contextual information, user application use information, or a combination thereof against the association, the one or more policy compliance profiles, the one or more contexts, or a combination thereof to determine one or more adaptions to one or more policies associated with the at least one application.

According to another embodiment, an apparatus comprises a least one processor, and at least one memory including computer program code for one or more computer programs, the at least one memory and the computer program code configured to, with the at least one processor, cause, at least in part, the apparatus to process and/or facilitate a processing of one or more policy compliance logs associated with at least one application to determine one or more policy compliance profiles associated with the at least one application. The apparatus is also caused to determine one or more contexts under which the at least one application operates. The apparatus is further caused to cause, at least in part, an association of the one or more policy compliance profiles with the one or more contexts. The apparatus is further caused to process and/or facilitate a processing of user contextual information, user application use information, or a combination thereof against the association, the one or more policy compliance profiles, the one or more contexts, or a combination thereof to determine one or more adaptions to one or more policies associated with the at least one application.

According to another embodiment, a computer-readable storage medium carries one or more sequences of one or more instructions which, when executed by one or more processors, cause, at least in part, an apparatus to cause, at least in part, the apparatus to process and/or facilitate a processing of one or more policy compliance logs associated with at least one application to determine one or more policy compliance profiles associated with the at least one application. The apparatus is also caused to determine one or more contexts under which the at least one application operates. The apparatus is further caused to cause, at least in part, an association of the one or more policy compliance profiles with the one or more contexts. The apparatus is further caused to process and/or facilitate a processing of user contextual information, user application use information, or a combination thereof against the association, the one or more policy compliance profiles, the one or more contexts, or a combination thereof to determine one or more adaptions to one or more policies associated with the at least one application.

According to another embodiment, an apparatus comprises means for processing and/or facilitating a processing of one or more policy compliance logs associated with at least one application to determine one or more policy compliance profiles associated with the at least one application. The apparatus also comprises means for determining one or more contexts under which the at least one application operates. The apparatus further comprises means for causing, at least in part, an association of the one or more policy compliance profiles with the one or more contexts. The apparatus further comprises means for processing and/or facilitating a processing of user contextual information, user application use information, or a combination thereof against the association, the one or more policy compliance profiles, the one or more contexts, or a combination thereof to determine one or more adaptions to one or more policies associated with the at least one application.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a mobile terminal (e.g., handset) that can be used to implement an embodiment of the invention.

DESCRIPTION OF SOME EMBODIMENTS

Examples of a method, apparatus, and computer program for policy adaption based on application policy compliance analysis are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
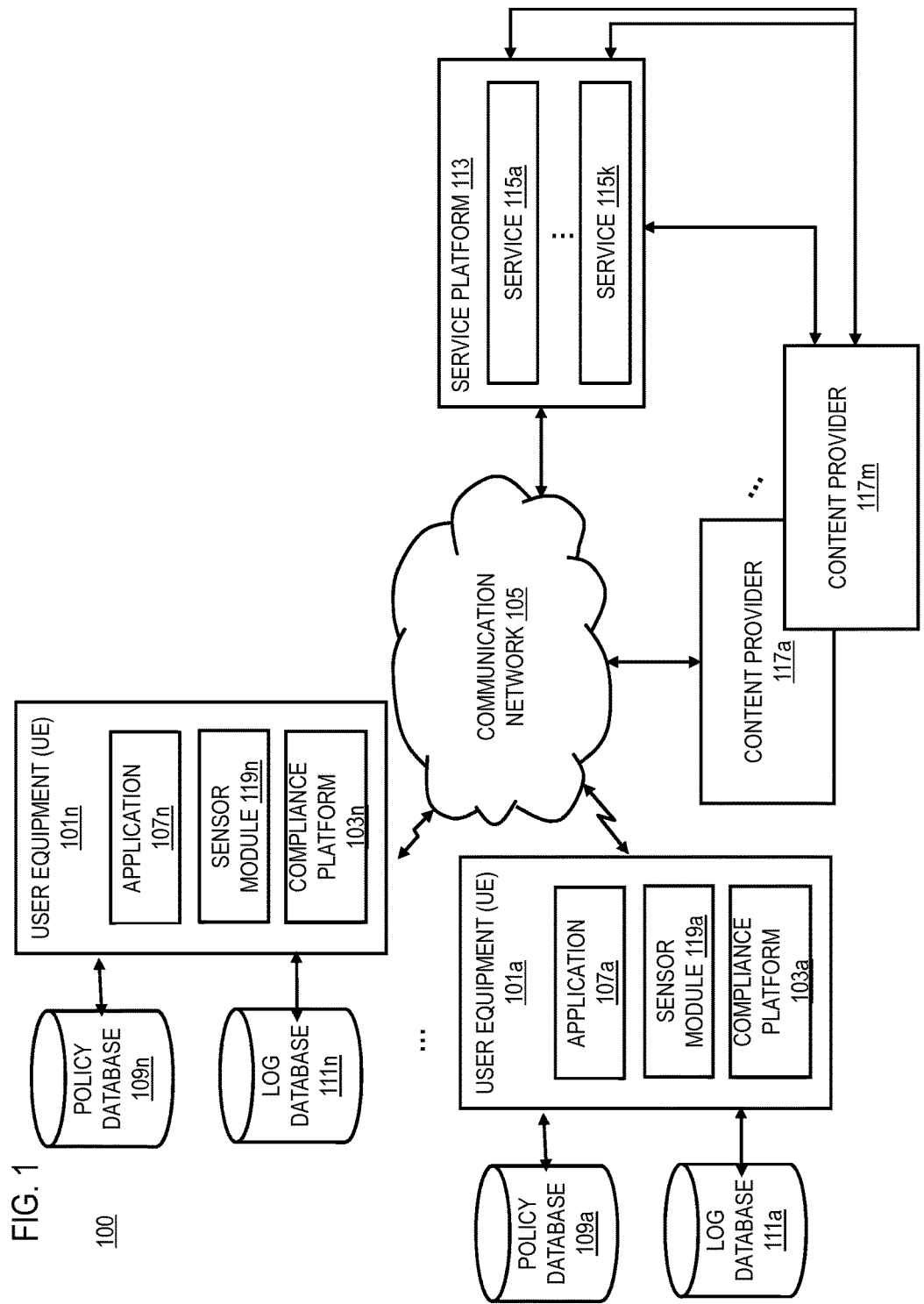
FIG. 1 is a diagram of a system capable of policy adaption based on application policy compliance analysis, according to one embodiment.

FIG. 1 is a diagram of a system capable of policy adaption based on application policy compliance analysis, according to one embodiment. With more and more personal data being collected and stored at user devices (e.g., via various embedded sensors) or in a cloud, there is an increasing need to ensure that their usage is compliant with access policies (e.g., privacy policies, security policies, performance policies, etc.). These policies, for instance, are often implemented by service providers to promise to end-users that their collected personal data will only be utilized in certain ways or for particular purposes (e.g., to prevent attacks by malicious applications). Currently, these applications access to user device resources are determined via a middleware API with fixed capabilities at installation, such that it is only possibly to specify which apps to access which user device resources at installation. There is a growing interest among the users to easily and effectively control the behavior of the applications on their devices via the policies in an on-going basis. However, given the diverse and complex nature of user device applications (e.g., photo/music/movie, navigation, weather, investment, banking, social network, ticket reservation, auction, IP phone, etc.), it is challenging for a user to comprehend the implications of personal data misuse by different types of applications and to manually define policies (e.g., access control, performance control, etc.) accordingly.

To address this problem, a system 100 of FIG. 1 introduces the capability to adapt policies for applications based on policy compliance analysis. The system 100 specifies one or more policies at the application installation time, monitors the application's behaviors with respect to the policies, prompts the user with suggestions, and then adapts the policies accordingly. Adaptation may lead to relaxing and/or restricting the policies.

It is noted that although various embodiments are described with respect to compliance with data access policies (e.g., privacy policies, security policies, etc.), it is contemplated that the approach described herein may be used with other policies, such as performance policies, etc. In one embodiment, the system 100 may import or formulate initial policies per application, converts the policies into auditing specifications, which specify which data to be logged, installs the auditing specifications per data resource in the user device, checks audit logs for compliance to the policies, determines any violations if not compliant, prompts the user with suggestions for compliance, and adapts the policies based on the user's selection. The initial policies may be written in a high level language, such as eXtensible Access Control Markup Language (XACML). By way of example, the initial data access policy for a gaming application is to allow access to resource with attribute Web Service, if subject is a process or thread and the action is to play or share.

As indicated, the data access policies defined for a user device application may include privacy policies, security policies, performance policies, etc. The auditing specification may be installed at data resources including data stores that are located in the user devices and operates under the policies to log data for policy auditing. The logging of the data may, for instance, commence upon the installation of the auditing specification at the data stores since the data to log is already specified in the auditing specification based on the initial policies. The processing of the data access policies and the installation may be totally or semi-automated, the details of which will be further explained below. In this way, a user would not need to manually adapt the data access policies, since the data access policies may be automatically adapted without user action upon, for instance, receipt of the user approval. In one embodiment, the system 100 prompts the user with an alert of each violation and a relevant suggestion of policy adaption. In another embodiment, the system 100 offers the user one or more selections of default policies of policy adaption, such that the system 100 can automatically adapt policies based upon the default policies without consulting the user. By way of example, the system 100 automatically suspends an e-wallet application after three failed pass code submission attempting to access credit card data.

The data to log may include data related to operations performed on the data stores such as transfers, modifications, utilizations, accesses, etc. The data stores may include information or content collected from user devices, associated applications, etc., as well as other data associated with the collected information or content. The data stores may include data repositories like relational databases, object-oriented databases, operational data stores, distributed data stores, flat files that can store data, etc.

As shown in FIG. 1, the system 100 comprises a user equipment (UE) 101 or UEs 101a-101n that include compliance platforms 103a-103n (collectively referred to as a compliance platform 103). In such an embodiment, for instance, compliance information and contextual information to be processed by the compliance platform 103 may reside and remain at the UE 101. Thus, where the UE 101 is a mobile device, such an embodiment may reduce the resource consumption of, for example, the battery, by avoiding transmitting the compliance information and contextual information over the communication network 105. Such an embodiment may also reduce privacy issues by maintaining private information at the UE 101 without transmitting the private information over the communication network 105. Alternatively, the UE 101 is connected to the compliance platform 103 via a communication network 105. In one embodiment, the compliance platform 103 may be embodied in one or more services 115a-115k on a service platform 113.

The UE 101 may include or have access to an application 107 (e.g., applications 107a-107n) to perform all or some of the functions of the compliance platform 103 such that the functions of the compliance platform 103 are embodied in one or more of the applications 107. In some embodiments, the one or more applications 107 enable the UE 101 to interact with, for instance, the compliance platform 103 to perform all or some of the functions of the compliance platform 103. The functions of the compliance platform 103 may include: (a) establish initial data access policies when installing the applications; (b) initiate logging of the data; (b) process the data for comparison against the data access policies, etc., to determine the compliance with the data access policies; (d) generate notifications, reports, etc., with respect to the compliance with the data access policies; (e) determine any violations if not compliant, (f) suggest policy adaption to the user; and (g) adapt the policies based on user selection and/or default policies of policy adaption.

The compliance platform 103 may include or have access to a policy database 109 to access, adapt or store policy information (e.g., data access policies, auditing specifications, default policies of policy adaption, etc.) associated with users, devices, applications, and data stores, etc. The compliance platform 103 may also include or have access to a log database 111 to access or store data access request logs and policy compliance profiles associated with the data access policies, the auditing specifications, etc. The policy compliance profiles ("fingerprints") may include data access request characteristics, data access characteristics of an application with respect to certain data access policies, etc. The data access request characteristics may include the data access request context (e.g., data type, requesting time, requesting frequency, etc.), whether the contexts are permitted by the respective policies, the details of a potential/actual validation of the data access requests, etc. By way of example, the data type may be a name, address, date of birth, marital status, contact information, ID issue and expiry date, financial records, credit information, medical history, travel location, interests in acquiring goods and services, etc., while the policies may define how an application may collect, store, and release/share the data per data type. The policy compliance profiles can be discovered by analyzing the data access requests and actual data access characteristic for each application.

The collected information or content may be obtained or stored at data stores located at the policy database 109, the log database 111, a service platform 113, one or more services 115 (or services 115a-115k), one or more content providers 117 (or content providers 117a-117m), and/or other services available over the communication network 105. It is noted that the compliance platform 103 may be a separate entity of the system 100, a part of the one or more services 115 of the service platform 113, or included within the UE 101 (e.g., operating in conjunction with or independently from the application 107). In one embodiment, the UEs 101 may include sensor modules 119a-119n (also collectively referred to as sensor modules 119) to determine context data associated with the plurality of application data requests (e.g., location information, timing information, orientation, etc.). The sensor modules 119 may be utilized by the compliance platform 103 to learn policy compliance profiles as well as to adapt the data access policies.

In some embodiments, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the system 100 may determine one or more contexts and/or contextual parameters associated with the one or more data access policies. By way of example, the context data can be generated by one or more sensors built-in to the user devices, e.g., an orientation sensor, an accelerometer, a timing sensor, a global position system (GPS), an electronic compass, etc. In one embodiment, the context data associated with the plurality of application data requests and/or policy compliance profiles can include time information, a position of the UEs 101, an altitude of the UEs 101, a tilt of the UEs 101, an orientation/angle of the UEs 101, a zoom level of the camera lens of the UEs 101, a focal length of the camera lens of the UEs 101, a field of view of the camera lens of the UEs 101, a radius of interest of the UEs 101 while capturing the media content, a range of interest of the UEs 101 while capturing the media content, or a combination thereof. The position of the UEs 101 can be also be detected from one or more sensors of the UE 101 (e.g., via GPS). The user's location can be determined by Cell of Origin, wireless local area network triangulation, or other location extrapolation technologies. Further, the altitude can be detected from one or more sensors such as an altimeter and/or GPS. The tilt of the UEs 101 can be based on a reference point (e.g., a camera sensor location) with respect to the ground based on accelerometer information. Moreover, the orientation can be based on compass (e.g., magnetometer) information and may be based on a reference to north. One or more zoom levels, a focal length, and a field of view can be determined according to a camera sensor.

The one or more contextual parameters may, for instance, include one or more temporal parameters, one or more location parameters, and/or one or more activity parameters. As such, the system 100 may then determine one or more policy compliance profiles for applications based, at least in part, on the one or more contextual parameters. In one scenario, the processing of the one or more entries is stored in a logging database residing on the user device. By way of example, policy compliance logs for a fitness training application may include entries of data requests for moving speeds, directions, and locations of the user device at different time points/periods of the day, and the relevant policy compliance profiles show whether these data requests are made according a training plan of the user to detect any validations (e.g., a location data request at midnight that is outside of the training schedule and possibly invade the user's privacy).

In another embodiment, the data may be processed and compared against the one or more data access policies and/or the one or more specifications per data store to determine the compliance with the one or more data access policies for the applications. By way of example, data related to the one or more operations (e.g., transfers, modifications, utilizations, accesses, etc.) performed on the one or more data stores by one or more applications (e.g., weight-watching, personal training, travel planning, etc.), one or more services (e.g., social networking, dating, etc.), one or more third parties (e.g., advertisers, consumer credit reporting agencies, debt collection agencies, private investigators, insurance companies, etc.), etc., may be compared against one or more policy-monitored operations to generate policy compliance profiles and determine whether the one or more performed operations are in compliance. In one scenario, the data access policies associated with a particular data store may forbid transfers of collected user-identifiable information to third parties. For example, the data access policies may require removal of collected user-identifiable information (e.g., user current location address and a time stamp) from a subset of collected user data (e.g., user location) prior to the transfer of that subset a particular third party (e.g., advertisers). Such data transfers to third parties may be monitored for user-identifiable information to determine compliance with the data access policies. The system 100 analyzes policy logs (and its violations) to learn/build policy compliance profiles (e.g., fingerprints) for different applications subject to various contexts (e.g., time, locations, events, etc.). Based on analysis of the policy compliance profiles, the user profile, and the contextual information, the system 100 may report to the user a potential privacy threat with suggestions/recommendations to adjust policies based on the given context.

In another embodiment, the system 100 processes one or more policy compliance logs associated with an application to determine one or more policy compliance profiles associated with the application. The system 100 determines one or more contexts under which the at least one application operates, and associates the one or more policy compliance profiles with the one or more contexts. The system 100 then processes user contextual information, user application use information, or a combination thereof against the association, the one or more policy compliance profiles, the one or more contexts, or a combination thereof to determine one or more adaptions to one or more policies associated with the application. The system 100 may determine that a predetermined threshold with respect to a number of violations satisfying a particular contextual parameter (e.g., data transfers outside one or more trusted geographical regions) has been reached. By way of example, three location data requests were processed and transferred by a social network application to Nigeria while the user lives in the US and has no tie to Nigeria. As such, a report including the entries that indicate violations satisfying the particular contextual parameter may be generated and prompted to the user as an alert to signify non-compliance with the data access policies.

The policy adaptation may include making policies more restrictive (e.g., to better protect user privacy) and/or relaxing policies (e.g., to allow the application to better execute its functionality while still providing the desired privacy level). The system 100 can further restrict the policies by limit or eliminate data access requests per data type, timing, frequency, etc. The system 100 can further relax the policies by allow or expand data access requests per data type, timing, frequency, etc.

In another embodiment, the system 100 uses the policy logging records to detect abnormal application behavior, and detects misuse falling outside of the policy compliance profiles, such as repeated attempts to access a restricted resource or a large number of data access events within a short time interval, that are prohibited according to the policy compliance profiles. By way of example, five credit card data requests were received via an airline company website in one minute while the user is booking flight tickets.

In another embodiment, one or more suggestions/recommendations with respect to the compliance with the one or more data access policies may be adapted. In one use case, there may be various levels of treatment for different non-compliant operations. For example, restriction on transfers of user-identifiable information to third parties may be subject to a higher level of scrutiny, as compared with restriction on transfers of collection information that does not include any user-identifiable information. As such, a transfer of user-identifiable information to third parties (e.g., even transfers permitted by a high-level policy manager) may trigger a notification/suggestion that includes information relating to restriction on the particular transfer to be generated and presented to the user. By way of example, the adaptation algorithm used by the system 100 may be based on or takes into account user contextual attributes, such that the adapted policies better reflect user preferences and habits. Such adaptations may further take into account any modifications in the user environment (e.g., relocating to a new place). The system 100 thus spares the user from manually adapting the data access policies.

In another embodiment, the policy compliance profiles may be determined based on minimizing an amount of the policy compliance data to log. By way of example, the amount of the data to log may be minimized based on one or more operation types, one or more parameter values, one or more database instances, etc. In one use case, the data to log for various database instances may be limited to "insert" operations. By way of another example, the amount of data to log may be minimized based on one or more contextual parameters. The one or more contextual parameters may, for instance, include one or more temporal parameters, one or more location parameters, and/or one or more activity parameters. Thus, the policy compliance logs may be based on the one or more contextual parameters to minimize the amount of the data to log. In this way, execution time associated with compliance verification (e.g., part of data usage control) as well as the negative effect on real-time database performance may be reduced.

In another embodiment, the one or more data access policies may be determined to be in a predetermined format, a policy language, and/or a high level language. The one or more data access policies may then be parsed according to the predetermined format, the policy language, and/or the high level language to extract one or more auditing specifications. The compliance log data may then be compared against the one or more auditing specifications to determine the policy compliance profiles. In one scenario, the one or more data access policies may include Metric First Order Temporal Logic (MFOTL) language. As an example, predicates (e.g., tokens) in a given MFOTL policy may be extracted by passing the MFOTL policy and a MFOTL regular expression as an input string and an input pattern respectively to a parser function for generating the one or more auditing specifications. In some cases, the predicates may be further filtered to extract the type of operations, database instances, and parameters values to be monitored.

In another embodiment, one or more contextual parameters associated with the one or more data access policies may be determined. The one or more auditing specifications may then be determined based on the one or more contextual parameters. As mentioned, the one or more contextual parameters may include one or more temporal parameters, one or more location parameters, and/or one or more activity parameters. By way of example, the determined auditing specifications may include a time-based mechanism to enable or disable logging based on the temporal parameters in the respective one or more data access policies to be monitored. In one scenario, while logging all "insert" operations in a particular table of various database instance may be sufficient for a certain purpose, the logging of the data may be further minimized based on temporal parameters. Logging an "insert" operation, for instance, in a table in a particular database instance may be irrelevant with respect to evaluating the associated data access policy if the "insert" operation did not occur within a predetermined time period (e.g., thirty minutes) for the table of another database instance. As such, the particular "insert" operation may not be logged based on the determined auditing specifications.

By way of another example, the one or more data access policies may include the policy that "No user activity information should be collected when the user is in the office." In MFOTL, such policy may written as the following: update[1](u,location, 'office')→NOT insert[1](u,activity, null), where u represents the user, location and activity represents respective tables, and 'office' represents the location parameter (e.g., the location parameter unit is of the granularity 'home,' 'office,' 'supermarket,' etc.). If, for instance, this policy is the only policy defined on the location table, then it may be sufficient to only log "update" operations on the location table with the value 'office.'

In another embodiment, the data and/or the logging of the data may be monitored based on the one or more contextual parameters. In one use case, one or more entries of one or more data logs may be generated based on the logging of the data. The one or more entries may, for instance, be iteratively processed to determine the compliance (or non-compliance) with the one or more data access policies. As the one or more entries are being processed, a collection including a subset of the one or more entries may be maintained with respect to certain operations performed on the one or more data stores (e.g., operations satisfying the one or more temporal parameters). Additionally, or alternatively, entries may be discarded from the collection whenever the entries become irrelevant for detecting further violations of the one or more data access policies.

For the purpose of illustration, the following scenario is provided. An application accesses user device resources via a middleware API (e.g., the Qt Mobility API). Qt is a cross-platform application and UI framework that allows developers to write applications once and then deploy them across many desktop and embedded operating systems without rewriting the source code. The user device resources may include input devices such as sensors (e.g., GPS, accelerometer, proximity sensor, ambient light sensor, etc.), camera, microphone, as well as data stored on the user device (e.g., file system access, contacts, call logs, etc.). With logging enabled, details of each access request (e.g., an API invocation also referred to as a query) are logged in a logging database. Query details logged may include a timestamp, an application performing the query, a type of resource for which access is requested, etc. The logging database can, for instance, be a SQLite database resident on the user device. SQLite is an ACID-compliant embedded relational database management system contained in a small (.about.275 kB) C programming library. SQLite implements most of the SQL standard, using a dynamically and weakly typed SQL syntax that does not guarantee the domain integrity. SQL (Structured Query Language) is a programming language designed for managing data in relational database management systems (RDBMS).

In one embodiment, for privacy preserving APIs, the given query is first validated against user-specified or system generated privacy policies before the query results can be returned. This ensures that the application/system behavior is in compliance with defined privacy policies. This validation is performed by an auditing engine. If the validation fails, then the violation details are added to the corresponding query details record in the logging database. The violation details include the privacy policy leading to the violation, the conflicting clauses and values in the policy and query respectively, etc. On the other hand, the query is forwarded to the user device OS if the validation is successful. The OS evaluates the query, and returns the query results to the application.

In one embodiment, the adaptation algorithm is based on mining policy compliance logs which is a background process and does not affect real-time performance.

By way of example, the UE 101, the compliance platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
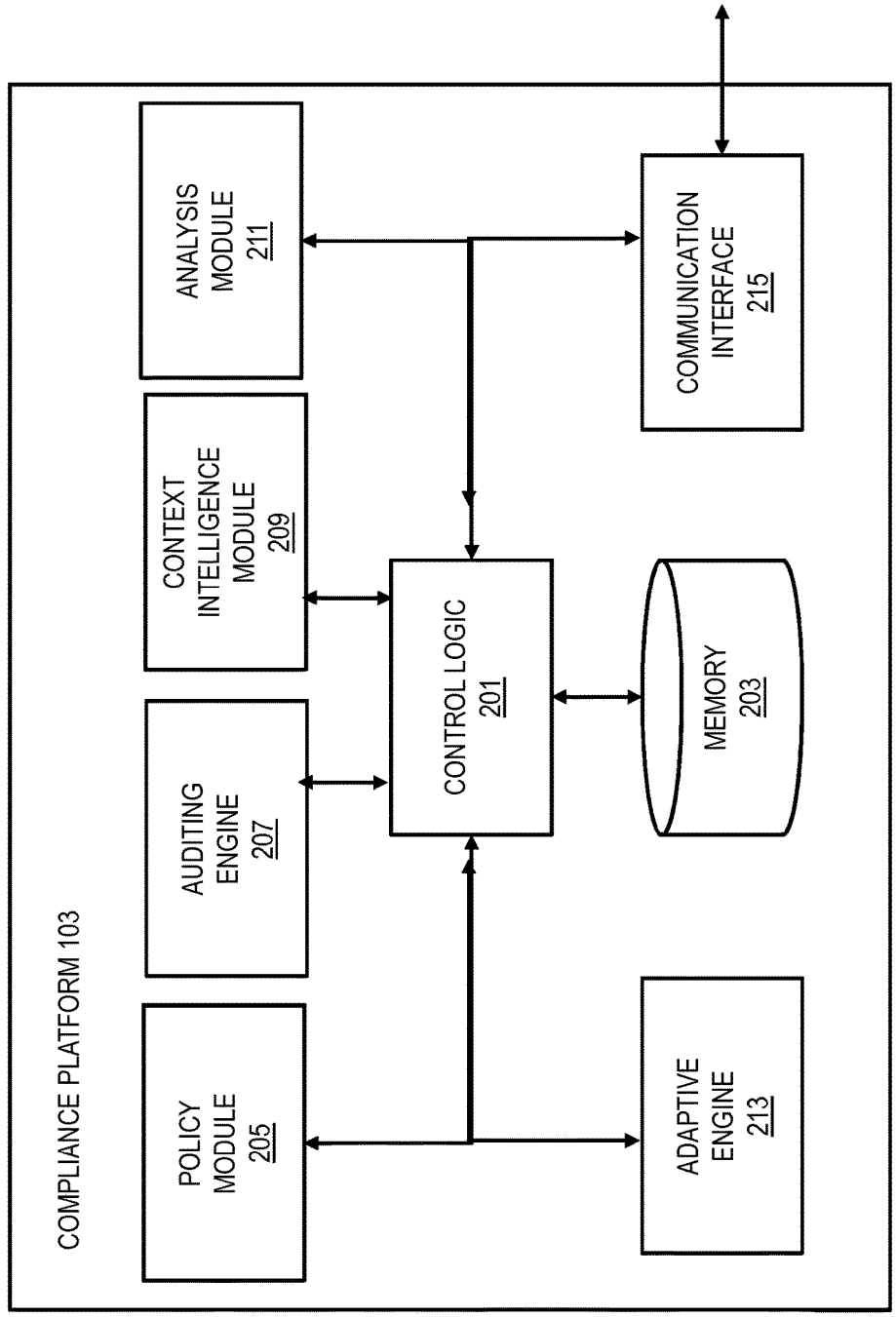
FIG. 2A is a diagram of the components of a compliance platform, according to one embodiment.

FIG. 2A is a diagram of the components of a compliance platform, according to one embodiment. As discussed above, the compliance platform 103, the policy database 109 and/or the log database 111 may be embodied at the UE 101, such that one or more hardware and/or software modules and/or elements of the UE 101 perform the functions associated with the compliance platform 103, the policy database 109 and/or the log database 111. For instance, the functions of the compliance platform 103 may be performed by one or more applications 107 and the information included within the policy database 109 and/or the log database 111 may be stored at a local memory within the UE 101. In one embodiment, the functions associated with the compliance platform 103 may be embodied in one or more services 115 on the service platform 113, or be a standalone element of the system 100, and the UE 101 may communicate with the compliance platform 103 over the communication network 105. Thus, the functions of the compliance platform 103 may be performed at the UE 101 or at one or more elements of the system 100.

By way of example, the compliance platform 103 includes one or more components for policy adaption based on application policy compliance analysis. It is contemplated that the functions of these components may be combined in one or more components or performed by other components of equivalent functionality. In this embodiment, the compliance platform 103 includes control logic 201, memory 203, a policy module 205, an auditing engine 207, a context intelligence module 209, an analysis module 211, an adaptive engine 213, and a communication interface 215.

The control logic 201 executes at least one algorithm for executing functions of the compliance platform 103. For example, the control logic 201 may interact with the policy module 205 to determine initial data access policies. Most mobile platforms, such as Meego®, Android®, Windows Phone®. (WP7), provide a need-based access control model where access to user device resources is only given to an application after explicit user authorization. By way of example, the policy module 205 starts with policies that App A can access resources r1, . . . , rn as approved by the user. From an implementation perspective, the compliance platform 103 recommends the user with policies of state-of-the-art implementations as stored in memory 203, and then adapts the initial policies to match with one or more user contexts as discussed later.

The policy module 205 may process data access policies to determine auditing specifications that specify data to log for determining a compliance with the initial or adapted data access policies. The policy module 205 may, for instance, work with the auditing engine 207 to determine policy compliance profiles for different applications.

The control logic 201 may then direct the auditing engine 207 to process the data for comparison against the data access policies, the auditing specifications, etc., to determine the compliance with the data access policies. An application accesses user device resources via a middleware API (e.g., the Qt Mobility API). The user device resources may include input devices such as sensors (e.g., GPS, accelerometer, proximity sensor, ambient light sensor, etc.), camera, microphone, as well as data stored on the user device (e.g., file system access, contacts, call logs, etc.). With logging enabled, details of each access request (e.g., an API invocation also referred to as a query) are logged in a logging database. The logging DB can, for instance, be a SQLite database resident in memory 203 on the user device. Query details logged may include a timestamp, an application performing the query, a type of resource for which access is requested, etc.

The auditing engine 207 may, for instance, compare operations (e.g., data access requests, execution performance, etc.) performed on the data stores by applications, services, third parties, etc., against policy-monitored operations (e.g., transfers, modifications, utilizations, accesses, etc.) to determine whether the performed operations are in compliance with the policies. By way of example, for privacy preserving APIs, the auditing engine 207 first validates the given query against user-specified or system generated initial privacy policies before the query results can be returned to the logging database. This ensures that the application/system behavior is in compliance with the initial or adapted privacy policies. If the validation fails, the auditing engine 207 adds the violation details to the corresponding query details recorded in the logging database. The violation details may include the privacy policy leading to the violation, the conflicting clauses and values in the policy and query respectively, etc. On the other hand, the auditing engine 207 forwards the query to the control logic 201, a user device OS, or one or more dedicated processors controlling access to sensors and relevant databases, if the validation is successful. The control logic 201, the OS, or the dedicated processors then evaluate the query, and return the query results to the application.

The control logic 201 may further employ the auditing engine 207 to generate notifications, reports, etc., with respect to the compliance (including violations) with respect to the data access policies to the logging database, user interface, or a combination thereof. As indicated, different levels of scrutiny may apply based on the particular operations performed on the data stores. Therefore, the auditing engine 207 may generate notifications, reports, etc., based on the particular level of scrutiny applied to the various performed operations (e.g., high-priority notifications for operations associated with a high-level of scrutiny).

The control logic 201 may then direct the context intelligence module 209 to detect contexts via sensor data and context database, feature extraction and fusion, user profile learning, logging DB and logs analysis, or a combination thereof. The context intelligence module 209 may also determine contextual parameters, such as temporal parameters, location parameters, activity parameters, etc., associated with the data access policies. In addition or alternatively, the context intelligence module 209 decides what parameters or attributes to choose to represent user context and/or preferences.

In some embodiments, App A can access resource groups $g_i, \ldots, g_n$, where each $g_i$ corresponds to a set of resources $g_i$ ($r_1, \ldots, r_n$) with the possibility to further specify the following attributes for each resource $r_i$:

Frequency: the frequency f with which App A can access $g_i(r_i)$.

Time interval: restrict of or allow access within time interval $[t_1, t_2]$.

Accuracy: the accuracy level of data that can be returned to App A by $g_i(r_i)$. With location, for instance, it is possible to have data at different levels of abstraction e.g. co-ordinate level, city level, country level, etc.

Context: With the contextual attribute C, it is possible to specify access control with respect to the current contextual state of the user. We define the contextual state as consisting of values corresponding to the different categories, e.g. location, activity, social interaction, etc. (for illustration purposes—other contextual attributes can be analogously accommodated). The contextual attribute C is thus represented as $\{(g_L,V),(g_A,V),(g_S,V)\}$, where L, A, and S correspond to location, activity and social interactions respectively, and V denotes a set of values. Following this notation, we define context at time $[t_1, t_2]$ as $C=C\{[t_1, t_2],(g_L,V),(g_A,V),(g_S,V)\}$.

By way of example, a policy that App A is not allowed to access my camera whenever the user is talking at a location $L=\{l_m,l_k\}$ or talking to people $P=\{p_k,p_m\}$ is represented as:

App $A \rightarrow$ deny(camera,_,$\{(g_L,L),(g_A,\_),(g_S,P)\}$).

The "whenever" may be replaced by time interval $[t_s,t_e]$, and the modified rule is represented as follows:

App $A \rightarrow [t_s,t_e]$deny(camera,_,$\{(g_L,L),(g_A,\_),(g_S,P)\}$).

In logic languages, the character "_" in the policies indicates that the value is not restricted (i.e., allows any value).

The control logic 201 may then direct the analysis module 211 to learn an application policy compliance profile $A_P$. In one embodiment, the analysis module 211 derives an application policy compliance profile $A_P$ based on analysis of the application data requests. In one embodiment, the application policy compliance profile $A_P$ is described by a state machine showing dependences between location, activity and social data queries and its time variations $A_P=A_P\{(g_L,V), (g_A,V), (g_S,V)\}$.

The analysis module 211 also analyzes policies violations, including violated clauses and their relevant parameters. More advanced logging analysis includes cases of misuse and anomaly detection.

The automatic or semi-automatic logging analysis of large quantities of data can extract previously unknown interesting patterns such as groups of data records (cluster analysis), unusual records (anomaly detection), and dependencies (association rule mining). This usually involves using database techniques such as spatial indexes.

Anomaly/outlier detection refers to detecting patterns in a given data set that do not conform to an established normal behavior. The patterns thus detected are called anomalies and often translate to critical and actionable information in several application domains. Anomalies are also referred to as outliers, change, deviation, surprise, aberrant, peculiarity, intrusion, etc. In the context of abuse and network intrusion detection, the interesting objects are often not rare objects, but unexpected bursts in activity. A cluster analysis algorithm may be able to detect the micro clusters formed by these patterns.

Rule based mining can be performed through either supervised learning or unsupervised learning techniques. In this case, user preferences and application behavior are unknown and may vary significantly, depending on a given context and a user. In one embodiment, the analysis module 211 detects anomaly based on a combination of rule-based and unsupervised learning with distance-based techniques.

Since the number of clusters may not be known in advance, the analysis module 211 applies recently developed bottom-up methods in statistical physics for community detection based on modularity maximization for policy compliance logs analysis. In this case, the analysis module 211 does not need to specify the number of clusters, yet automatically detects the number of clusters from the data logs to detect violations. The analysis module 211 marks the detected clusters in the application policy compliance profile as well as marks outliers (i.e., nodes located outside of the clusters) as potential violations. In other embodiments, the analysis module 211 performs policy logs analysis based on analysis of one or more application policy compliance profiles $A_P$, a current context state $C\{[t_i,t_j],(g_L, V), (g_A, V), (g_S, V)\}$ and its history, one or more user profile vectors (UPV), or a combination thereof. The analysis module 211 first checks whether there is a match between the application policy compliance profiles $A_P$ and the profiles provided by application developers. The UPV will be discussed in details in conjunction with FIGS. 3A-3D.

In other embodiments, the analysis module 211 further compares UPV, C and $A_P$ to dynamically modify policies according to context and user behavior. By way of example, the analysis module 211 receives and compares a requesting user's dating profile with the user's own dating profile at a night club. During the comparison, the analysis module 211 also detects other malicious data access by the dating application for financial data, the analysis module 211 immediately inform the adaptive engine 213 to take necessary action to suspend the dating application.

The control logic 201 may then direct the adaptive engine 213 to adapt the data access policies based on the contextual parameters determined by the context intelligence module 209. In other embodiments, the adaptive engine 213 adapts the data access policies based on the analysis results from the analysis module 211. When the adaptive parameters are determined, the adaptive engine 213 may adapts the initial policies into adapted policies and trigger an installation of the adapted policies at data stores.

The control logic 201 may also utilize the communication interface 215 to communicate with other components of the compliance platform 103, the UEs 101, the service platform 113, the services 115, the content providers 117, and other components of the system 100. For example, the communication interface 215 may transmit the generated notifications to the responsible policy officers, policy managers, etc., via their respective UEs 101. The communication interface 215 may further include multiple means of communication. In one use case, the communication interface 215 may be able to communicate over short message service (SMS), multimedia messaging service (MMS), internet protocol, instant messaging, voice sessions (e.g., via a phone network), or other types of communication.

Figure 2B:
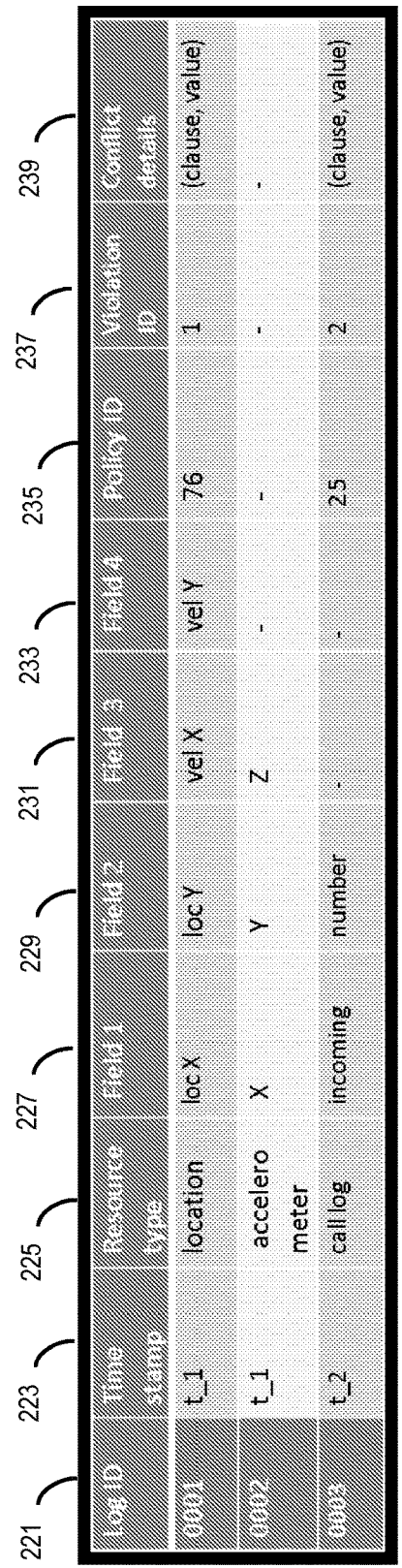
FIG. 2B is a diagram of a schema with data extracted from a logging database utilized for adapting policies, according to one embodiment.

FIG. 2B is a diagram of a schema with data extracted from a logging database utilized for adapting policies, according to one embodiment. As illustrated, the logging DB schema includes a log ID 221, an event time stamp (e.g., time of the operation) 223, a resource type 225, fields 227, 229, 231, 235 that vary depending on the resource type, a policy ID 235, a validation ID 237, and conflict details 239. By way of example, when the resource contains location data, fields 227, 229, 231, 235 correspond to parameters loc X, loc Y, vel X, vel Y, wherein loc: location and vel: velocity. As another example, when the resource contains accelerometer data, fields 227, 229, 231 correspond to the acceleration directions towards X, Y, Z. As yet another example, when the resource contains call log data, fields 227, 229 correspond to a type of call (e.g., incoming, outgoing, conference call, etc.) and the phone number. These details, along with other details, may be extracted by the auditing engine 207 to produce the relevant policy compliance log entries. The details may initially be extracted as binary data. The auditing engine 207 may transform and save the logged data in specific file formats, such as .txt, .cvs, .xml or xls file formats.

Figure 3A:
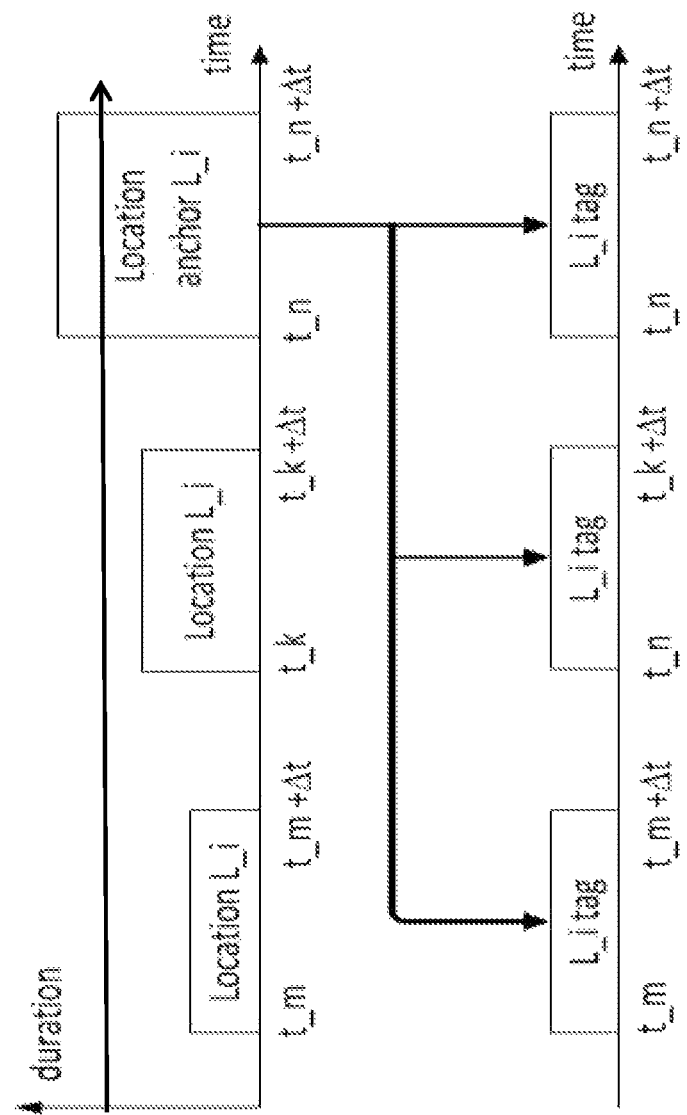
FIGS. 3A-3D are diagrams related to user profile vectors utilized in adapting policies, according to various embodiments.
Figure 3B:
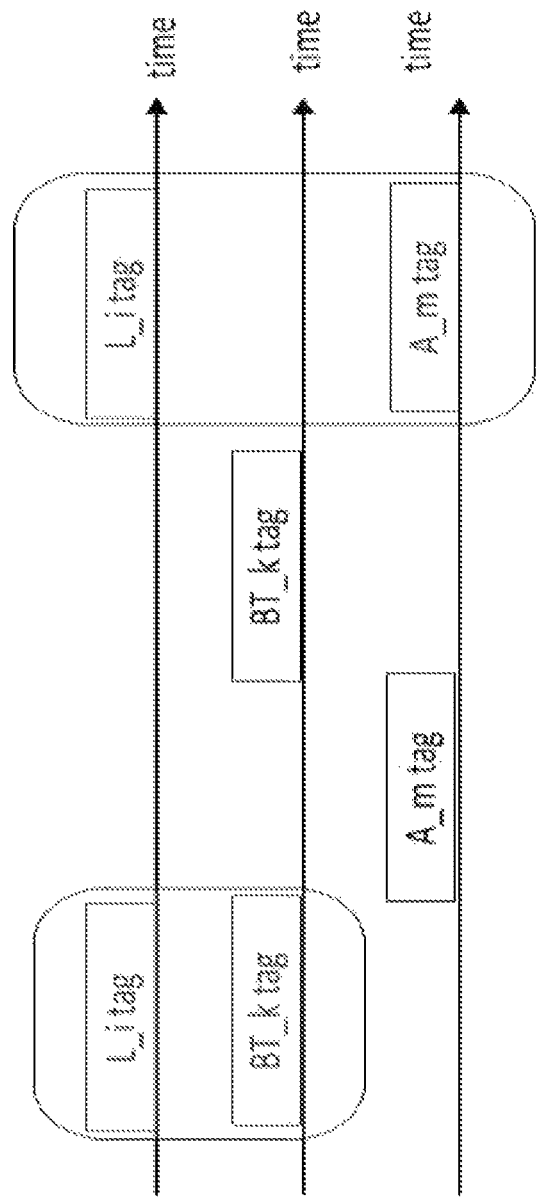

FIGS. 3A-3D are diagrams related to user profile vectors utilized in adapting policies, according to various embodiments. Referring back to user profile learning, in one embodiment, the compliance platform 103 creates user profile vectors (UPV) with the following algorithm. First, the compliance platform 103 collects data until a feature anchor is found and then tags all records in context database which include this feature. FIG. 3A shows how a location anchor is detected and tagged, according to one embodiment. When the time spent in a certain location {$locX_i$, $locY_i$} reaches a threshold (shown as a broken line), the compliance platform 103 forms a location anchor $L_i$ and adds a location tag $L_i$ to all previous records which include this location. FIG. 3B shows context attributes at different time intervals, according to one embodiment. In this case, a set of feature anchors at time interval $[t_1, t_2]$ forms a contextual attribute $C\{[t_1,t_2], (g_L,V),(g_A,V),(g_S,V)\}$. The compliance platform 103 applies this algorithm sequentially to tag all records, provided that the data has been collected for a sufficiently long period.

Figure 3C:
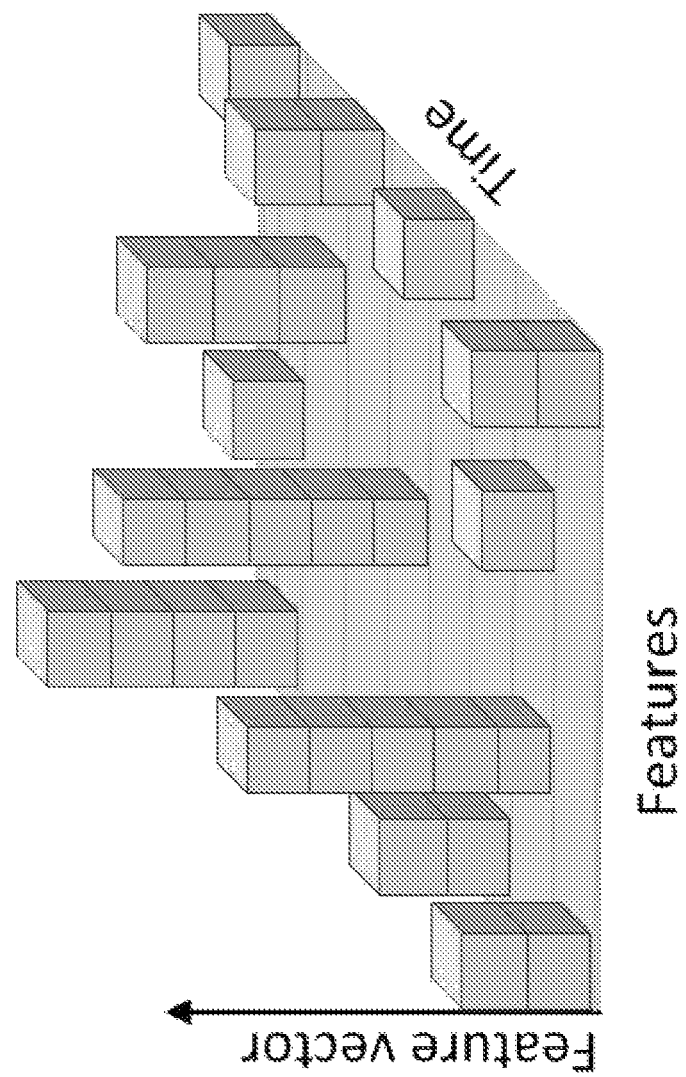
Figure 3D:
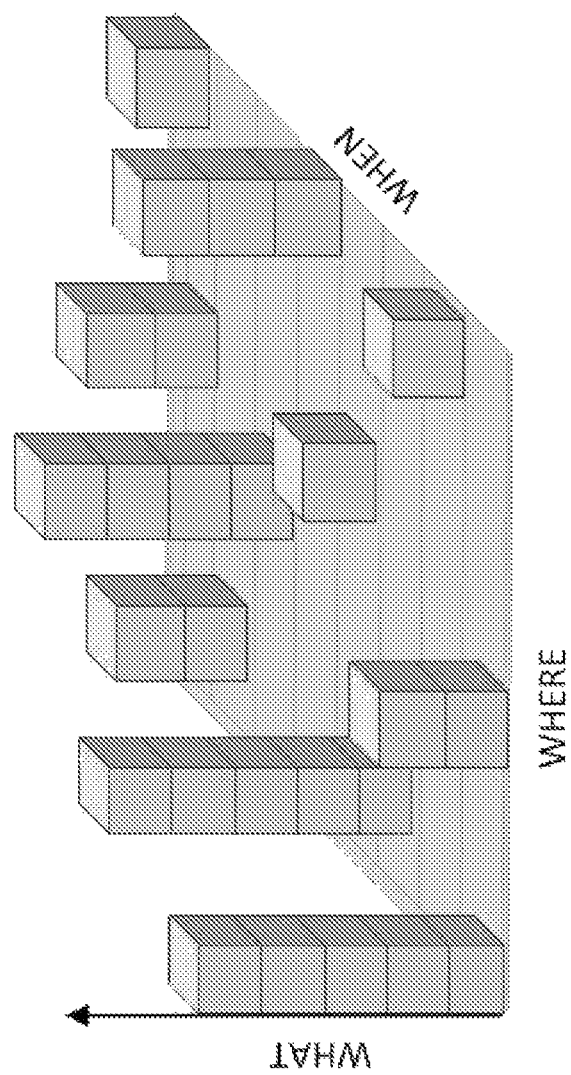

FIG. 3C shows contextual information in {time, feature, feature_parameters} dimensions, according to one embodiment. Alternatively, FIG. 3D presents the context information in "when/where/what" dimensions, according to one embodiment. The compliance platform 103 adds one of features (e.g., location) as the additional dimension and aggregates resulting 4D tensor data over time. The "when/where/what" dimensions present the user behavior averaged over time and referred in the following as a User Profile Vector (UPV)=t[$C\{[t_i,t_i],(g_L, V),(g_A, V),(g_S, V)\}$].

Figure 4:
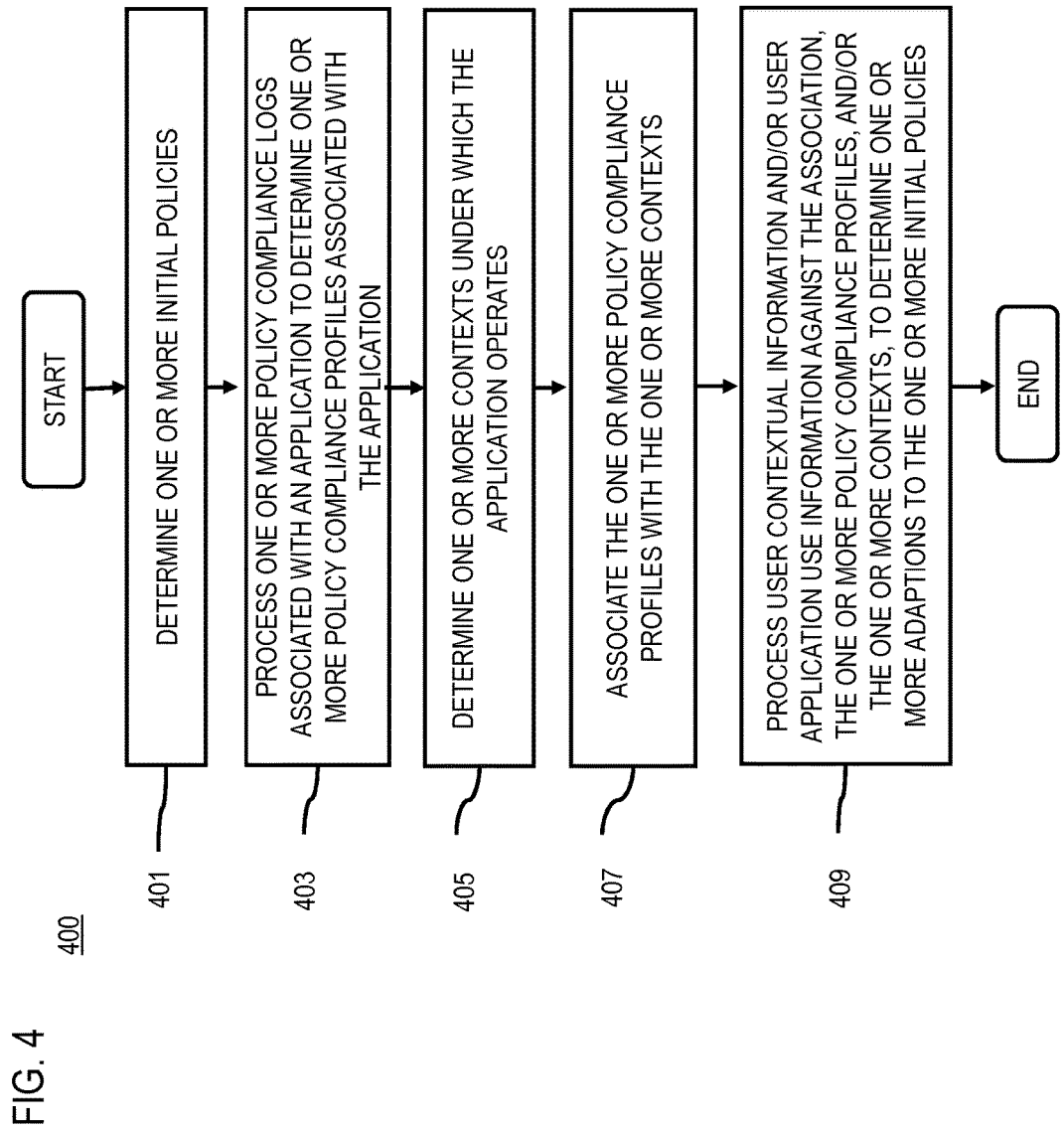
FIG. 4 is a flowchart of a process for policy adaption based on application policy compliance analysis, according to one embodiment.
Figure 7:
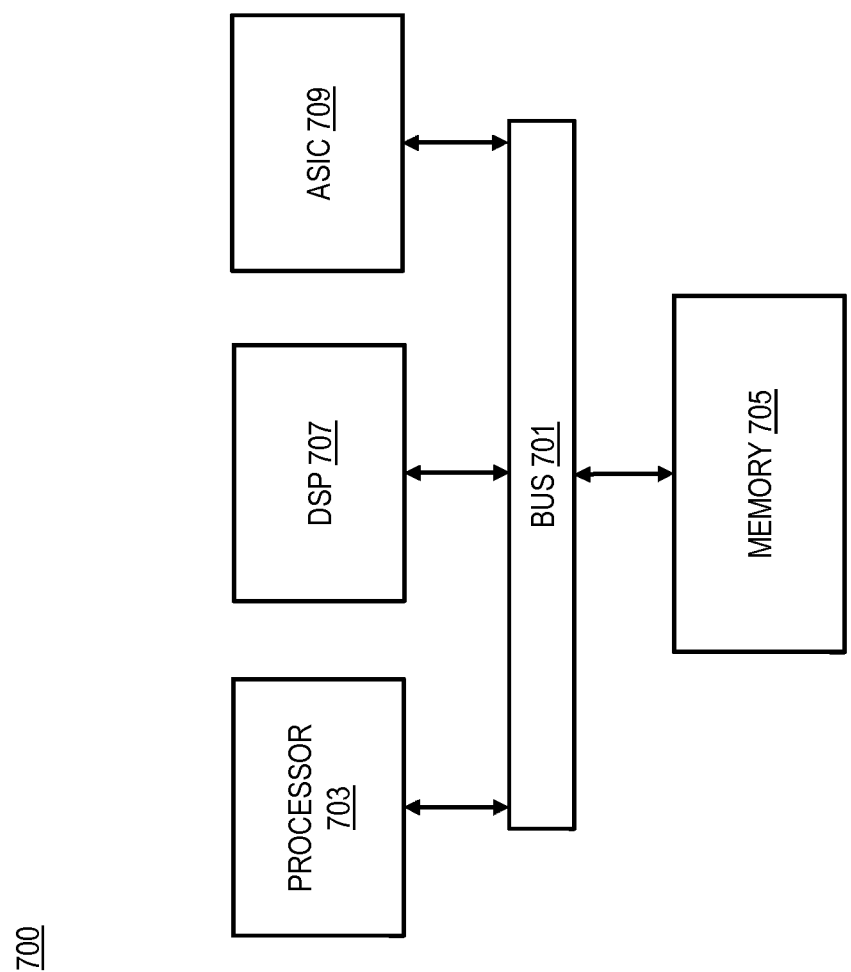
FIG. 7 is a diagram of a chip set that can be used to implement an embodiment of the invention.

FIG. 4 is a flowchart of a process for policy adaption based on application policy compliance analysis, according to one embodiment. In one embodiment, the compliance platform 103 performs the process 400 and is implemented in, for instance, a chip set including a processor and a memory as shown in FIG. 7. As such, the control logic 201 can provide means for accomplishing various parts of the process 400 as well as means for accomplishing other processes in conjunction with other components of the compliance platform 103.

In step 401, the compliance platform 103 determines one or more initial policies. At a high level, the compliance platform 103 operates as follows. The one or more policies include, at least in part, one or more privacy policies, one or more security policies, one or more performance policies, or a combination thereof. By way of example, the application (e.g., a fitness program) declares a list of resources (e.g., user age, weight, exercise type/location/times, duration/speed, etc.) to which it needs access in order to provide its functionality (e.g., recommending exercise routine/plan, logging exercise data, generating reports, sharing the report with a training buddy and/or a personal trainer, etc.) in, for example, an extensible markup language (XML) based Manifest files. Second, during installation, the Manifest file is read and at least one access request is presented to the user in a user-friendly language. Third, the application App A is allowed to be installed only when the user selects 'Yes' to access resources $r_1, \ldots, r_n$. In general, this implies that the user agrees to everything in the access request, or the application is not installed. In another embodiment, when the user only accepts one or some portions of the access request, the application is installed with reduced functionality (e.g., no sharing location data with the personal trainer) corresponding to the resources (e.g., location data) which denied access being disabled.

In step 403, the compliance platform 103 processes and/or facilitates a processing of one or more policy compliance logs (e.g., data requests for times of push up, running mileage, swim distance, etc.) associated with the at least one application (e.g., the fitness program) to determine one or more policy compliance profiles associated with the at least one application.

In one embodiment, relevant data included in the log files may, for instance, include: (a) the date and time of the event (e.g., operations); (b) whether the action succeeded (or permissions were denied); (c) the actual SQL statement that triggered the audit event (if applicable); (d) the connection context (server and instance, database schema); (e) the audit file name and the position of the audit record in the file; or (f) any other relevant information.

The one or more policy compliance profiles include, at least in part, one or more access frequencies, one or more access time intervals, one or more access data object levels, one or more access data context categories (e.g., time, location, activity, social interaction, etc.), or a combination thereof.

In step 405, the compliance platform 103 determines one or more contexts (e.g., time, location, events, etc.) under which the at least one application (e.g., the fitness program) operates. The context information may refer to discrete context characteristics/data of a user and/or the user device, such as a date, time, location (e.g., points of interest), current event/activity, weather, a history of activities, etc. associated with the user. In particular, the contextual data elements may include location (where the user/UE is available, wherein the location based services is applicable, etc.), activity dates (the range of dates for which the user/UE and/or the location based services is available), event type (event information associated with the user/UE), time (of the event if the user/UE involves), applicable context (in which the location based services is applicable), and user preference information, etc.

The user preference information includes user information and user preference data. Typical user information elements include a user identifier (e.g., telephone number), user device model (e.g., to identify device capabilities), age, nationality, language preferences, interest areas, login credentials (to access the listed information resources of external links). In one embodiment, the preference data is automatically retrieved and/or generated by the compliance platform 103 from external sources. In another embodiment, the preference information is recorded at the user device based upon user personal data, online interactions and related activities with respect to specific topics, points of interests, or locations, etc. It is contemplated that the user can define any number of preference elements and tokens as user preference data.

In some embodiments, the compliance platform 103 extracts one or more contexts via sensor data and a context database, feature extraction and fusion, user profile learning, logging DB and logs analysis, or a combination thereof.

In step 407, the compliance platform 103 causes, at least in part, an association of the one or more policy compliance profiles with the one or more contexts (e.g., time, location, event, etc.). By way of example, the policy compliance profiles of the fitness program are limited to gyms and a track field.

In one scenario, the data access policies associated with a particular data store may forbid access of collected user-identifiable information by a gaming application. Accordingly, such data access by the gaming application may be monitored for user-identifiable information to determine compliance with the data access policies (e.g., location data is accessible/viewable by trusted players).

In a further scenario, a high-level of scrutiny may apply to violations with respect to a requirement that user-identifiable information must be removed from collected information prior to a data access by the gaming application. Accordingly, accesses of user-identifiable information by the gaming application may trigger an alert that includes information relating to the particular data access to the user. By way of example, a new player tries to access the user's identification data thereby triggering an alert to the user and a denial of all data connection with the new user via the gaming application.

In step 409, the compliance platform 103 processes and/or facilitates a processing of user contextual information (e.g., user age, etc.), user application use information (e.g., location, time, frequency of playing the game, etc.), or a combination thereof against the association, the one or more policy compliance profiles, the one or more contexts (e.g., playing against which other players, scores, etc.), or a combination thereof to determine one or more adaptions to the one or more initial policies as the user contextual information, the user application use information, or a combination thereof are determined. With respect to intrusion detection, in one embodiment, the compliance platform 103 analyzes data in the logging database for anomalies or exception behavioral (e.g., another player attempts to access an award won by the user).

In one embodiment, the compliance platform 103 causes, at least in part, a presentation of the one or more adaptions as one or more recommendations (e.g., suspending the gaming application, blocking access to the award, blocking the access by a malicious player, etc.). The compliance platform 103 determines an input for selecting the one or more adaptations based, at least in part, on the presentation (e.g., blocking all access by a malicious player). The compliance platform 103 causes, at least in part, an application of the one or more adaptations to the one or more policies based, at least in part, on the one or more policies.

In one embodiment, the compliance platform 103 determines one or more context features (e.g., location, time, event, etc.), one or more user profiles (e.g., user profile vectors), or a combination thereof from the user contextual information, the user application use information, or a combination. The determining of the one or more adaptations are based, at least in part, on the one or more context features, the one or more user profile, or a combination thereof.

In one embodiment, the compliance platform 103 processes and/or facilitates a processing of the user contextual information, the user application use information, or a combination thereof against the association, the one or more policy compliance profiles, the one or more contexts to determine one or more anomalies (e.g., malicious access), one or more exceptions (e.g., award access only for an gaming platform administer), or a combination thereof. The determining of the one or more adaptations is based, at least in part, on the one or more anomalies, the one or more exceptions, or a combination thereof.

In one embodiment, the compliance platform 103 adapts the data access policies continuously, and upon user's authorization. In another embodiment, adapts the data access policies continuously, and in an automated manner.

The data access policies may be adapted to be more restrictive and/or relaxing. In one embodiment, the compliance platform 103 causes, at least in part, a specification of the one or more initial policies as one or more relaxed policies (e.g., any new player is accepted to play against the user and access gaming data). The compliance platform 103 determines the one or more adaptations for causing, at least in part, a restricting of the one or more relaxed policies, for example, by adding one or more new clauses to limit data access rights (e.g., only friends via FACEBOOK®. are accepted to play against the user and access gaming data).

As mentioned, the compliance platform 103 analyzes the logging database for exceptional behavior, violations, etc. By way of example, the initial data access policy App A is represented as access (r,_,{(I,_)(A,_),(S,_)}). When the compliance platform 103 detects the following exceptional behavior is detected: App A accesses resource r with a frequency>f, where f is the threshold frequency for anomaly detection, i.e., anything above which is considered suspicious, the compliance platform 103 further analyzes the logging database in correlation with user contextual data to assess if the behavior only occurs during time interval $[t_1,t_2]$ or when the user is at location L, performing activity A, and (socially) interacting S.

If the conditions are satisfied, the compliance platform 103 determines anomaly is detected and then prompts an alert to the user. If the user confirms that this is needed malicious behavior, the compliance platform 103 presents the user one or more of the options of uninstalling the application, restricting the frequency of access to $f_i$, restricting the time interval of access as $[t_s, t_e]$, restricting one or more contexts, or a combination thereof. Uninstalling the application is not recommended if the user is still interested in the application's functionality and would like to continue using it. As to restricting the contexts, if the user wants to restrict access based on location, for example, the compliance platform 103 determines and presents a list of locations $L_1$ (e.g., locations visited by the user as recorded in the logging database). The contexts may include other contextual categories, e.g. activity, social interaction, etc. The data access policy so adapted may be represented as:

$$\text{App } A \rightarrow [t_s, t_e] \text{access}(r, f_1, \{(g_L, L_1), (g_A, \_), (g_S, \_)\})$$

In addition to detecting anomaly based on the frequency of access, the compliance platform 103 may detect anomaly based on time intervals, contextual attributes, etc. By way of example, if App A always accesses r at a location $L_i$ in $g_L$, the access is basically legitimate yet there is room for optimization. The compliance platform 103 prompts the user with a notification to check whether it is sufficient for App A to have access to r only at location Li (i.e., access at locations in $g_L$ other than Li is not required). In one embodiment, the compliance platform 103 causes, at least in part, a specification of the one or more initial policies as one or more restrictive policies (e.g., only exiting players against the user can access the user's gaming scores). The compliance platform 103 determines the one or more adaptations for causing, at least in part, a relaxing of the one or more restrictive policies, such as by removing clauses to expand data access rights (e.g., all existing and new players can access the user's gaming scores). The policy relaxing may be required where the application is not able to execute its functionality fully. Another scenario requires policy relaxing is due to a change in the user's physical/surrounding attributes that leads to some policies become too restrictive.

In one embodiment, the compliance platform 103 analyzes the policy compliance logs in the logging database, especially violation entries. Continuing with the previous policy: App A→[$t_s,t_e$]access(r, $f_1,\{g_{L1},L_1),(g_A,\_),(g_s,\_)\}$), when the compliance platform 103 detects that App A's attempts to access resource r always leads to violations with respect to the policy, and the conflict details involve access requests occurred at location $L_{new}$ in $L_i$. A possible explanation for such violations is that the user has recently relocated to $L_{new}$. Given this, the compliance platform 103 prompts the user with an option to add $L_{new}$ to the "allowed" list of locations for App A to access resource r. After approved by the user, the adapted policy is represented as App A→[$t_s, t_e$]access(r, $f_1,\{(g_L,L_1.\text{orgate}.L_{new}),(g_A,\_),(g_S,\_)\}$).

In addition to detecting anomaly based on locations, the compliance platform 103 may detect anomaly based on frequency of access, time intervals, other contextual attributes, etc., and then relaxes the policies accordingly.

In one embodiment, the compliance platform 103 determines the user contextual information, the user application use information, or a combination thereof in real-time or substantially real-time.

Figure 5B:
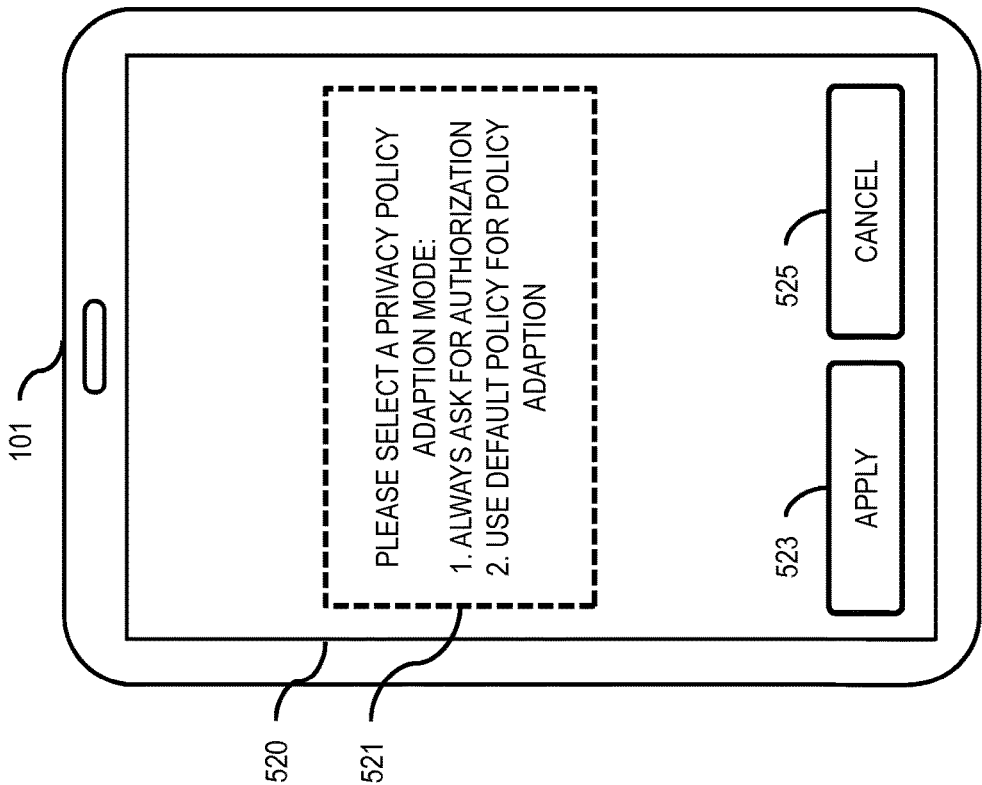
FIGS. 5A and 5B are diagrams of user interfaces utilized in the process of FIG. 4, according to various embodiments.
Figure 5A:
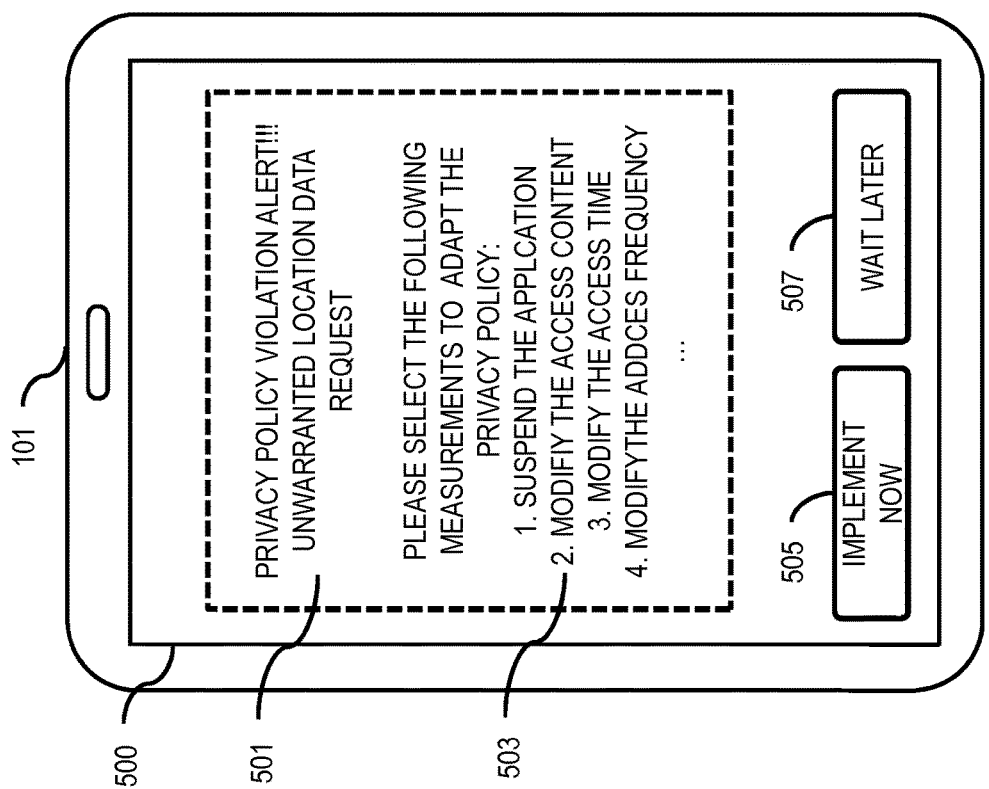

FIGS. 5A and 5B are diagrams of user interfaces utilized in the process of FIG. 4, according to various embodiments. FIG. 5A features the UE 101 utilizing a user interface 500 (e.g., of the application 107), which illustrates a notification/alert 501 as well as options 503. As shown, the user is presented with the notification 501 of an unwarranted location data request (e.g., from a weather application) and options 503 to adapt the policy by 1. Suspend the application, 2. Modify the access content, 3. Modify the access time, 4. Modify the access frequency, etc.

If the user selects one the options 503 (e.g., "Modify the access content"), the user may further select the tap "Implement Now" 505 or the tap "Wait Later" 507 to modify the access content excluding credit card data right away or later. The system 100 may then adapt and execute the data access policy accordingly. The adapted data access policy may thereafter be installed at the data stores (e.g., e-wallet) designated to operate under the data access policy to initiate logging of the data.

FIG. 5B features the UE 101 utilizing a user interface 520, which illustrates policy adaption modes 521: (1) Always ask for authorization, or (2) use default policy for policy adaption. The user can switch between the two modes at any time by selecting the tap "Apply" 523 or the tap "Cancel" 525. As discussed, the adaption and installation of the adapted data access policies may be authorized by a user. Alternatively, the adaption and installation of the adapted data access policies may be automated without user action upon, for instance, receipt of the data access policy for processing (e.g., when the application is installed/uploaded) according to a default policy for policy adaption. In this way, a user would not need to manually determine and select the particular policy to be adapted.

The above-described embodiments allow users the ability to implement device-wide data access policies, as well as to make data access policy decisions and/or assign security attributes for different applications.

The processes described herein for policy adaption based on application policy compliance analysis may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
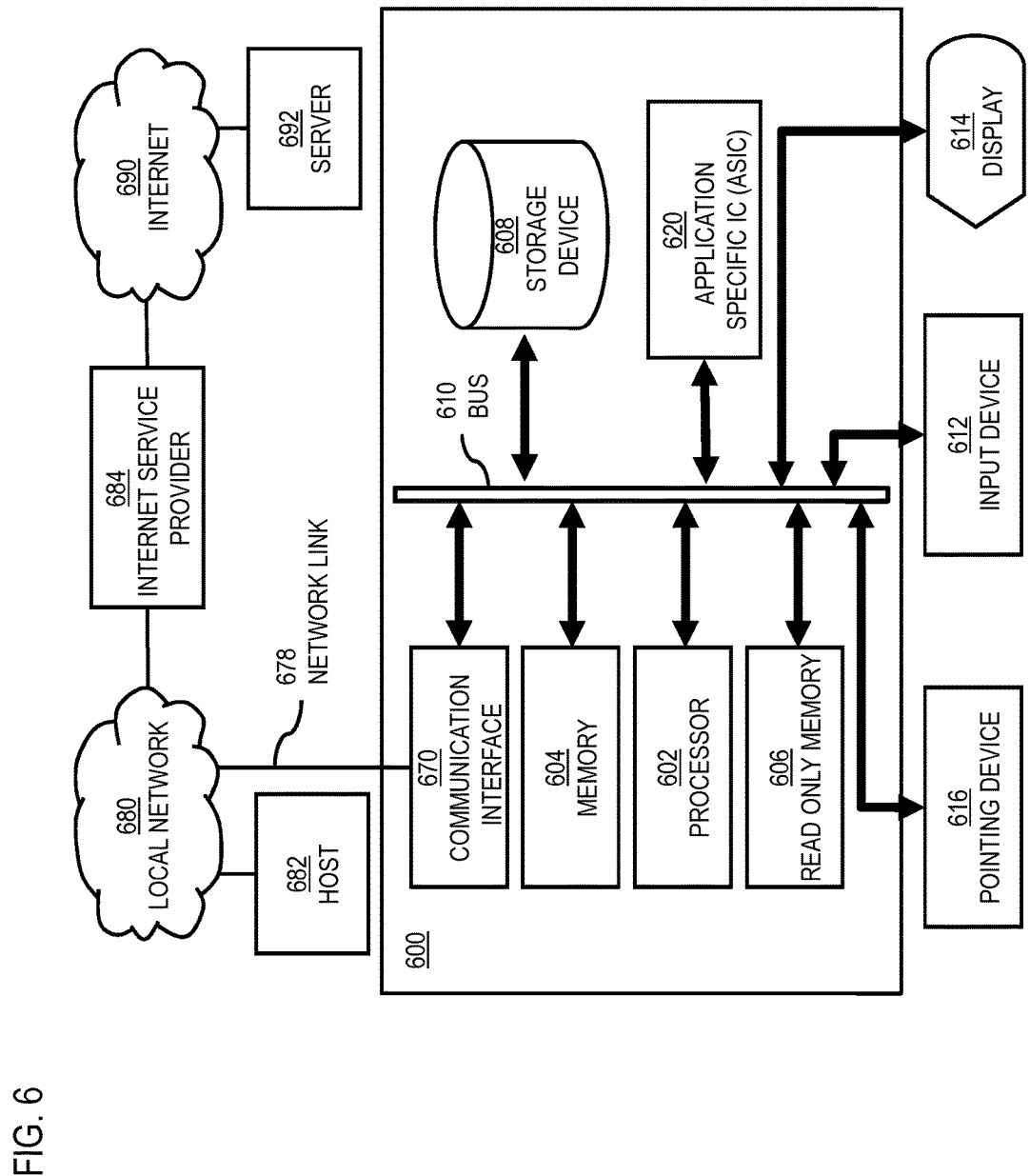
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide policy adaption based on application policy compliance analysis as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of policy adaption based on application policy compliance analysis.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide policy adaption based on application policy compliance analysis. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for policy adaption based on application policy compliance analysis. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for policy adaption based on application policy compliance analysis, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet.

Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection from the UE 101 to the communication network 105 for policy adaption based on application policy compliance analysis.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide policy adaption based on application policy compliance analysis as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of policy adaption based on application policy compliance analysis.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide policy adaption based on application policy compliance analysis. The memory 705 also stores the data associated with or generated by the execution of the inventive steps.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of policy adaption based on application policy compliance analysis. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of policy adaption based on application policy compliance analysis. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide policy adaption based on application policy compliance analysis. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method comprising:
   determining one or more contexts under which at least one application is currently operating, wherein the one or more contexts include online social interactions of one user with one or more other users via the at least one application;
   associating one or more privacy policy compliance profiles with the one or more contexts;
   processing the online social interactions and user application use information against an association of the one or more privacy policy compliance profiles with the one or more contexts to determine one or more adaptations to one or more privacy policies associated with the at least one application, wherein the association includes social network relationships between the user and the one or more other users;
   processing one or more predetermined thresholds with respect to one or more violations satisfying a contextual parameter of the online social interactions, to determine that the one or more predetermined thresholds have been reached, wherein the contextual parameter of the social interactions include frequencies of the online social interactions;
   when the one or more predetermined thresholds has been reached, generating a report, including entries indicating the one or more violations of the contextual parameter, as an alert to signify non-compliance with the one or more privacy policies;
   presenting the report and the one or more adaptations on a user interface;
   in response to a user approval of the one or more adaptations, automatically adapting the one or more privacy policies into one or more adapted privacy policies; and
   applying the one or more adapted privacy policies by restricting data access by or via the at least one application, blocking access to the at least one application, or a combination thereof.

2. A method of claim 1, further comprising:
   determining a specification of the one or more privacy policies as one or more restrictive privacy policies; and
   determining the one or more adaptations for causing, at least in part, a relaxing of the one or more restrictive privacy policies.

3. A method of claim 1, further comprising:
   determining a specification of the one or more privacy policies as one or more relaxed privacy policies; and
   determining the one or more adaptations for causing, at least in part, a restricting of the one or more relaxed privacy policies.

4. A method of claim 1, further comprising:
   determining the user contextual information, the user application use information, or a combination thereof in real-time or substantially real-time.

5. A method of claim 1, wherein the one or more adaptations are, at least in part, suggestions to adjust the one or more privacy policies based, at least in part, on the policy compliance profiles, the user profile, the user contextual information, or a combination thereof.

6. A method of claim 1, further comprising:
determining one or more context features, one or more user profiles, or a combination thereof from the user contextual information, the user application use information, or a combination thereof,
wherein the determining of the one or more adaptations is based, at least in part, on the one or more context features, the one or more user profile, or a combination thereof.

7. A method of claim 1, further comprising:
processing the user contextual information, the user application use information, or a combination thereof against the association, the one or more policy compliance profiles, the one or more contexts, or a combination thereof to determine one or more anomalies, one or more exceptions, or a combination thereof,
wherein the determining of the one or more adaptations is based, at least in part, on the one or more anomalies, the one or more exceptions, or a combination thereof, and
wherein the one or more policy compliance profiles include, at least in part, one or more access frequencies, one or more access time intervals, one or more access data object levels, one or more access data context categories, or a combination thereof.

8. A method of claim 1, wherein the online social interactions include game playing, weight-watching, personal training, travel planning, social networking, dating, or a combination thereof between the user and the one or more other users via the at least one application.

9. An apparatus comprising:
at least one processor; and
at least one memory including computer program code for one or more programs,
the at least one memory and the computer program code configured to, with the at least one processor, cause the apparatus to perform at least the following:
determine one or more contexts under which at least one application is currently operating, wherein the one or more contexts include online social interactions of one user with one or more other users via the at least one application;
associate one or more privacy policy compliance profiles with the one or more contexts;
process the online social interactions and user application use information against an association of the one or more privacy policy compliance profiles with the one or more contexts to determine one or more adaptations to one or more privacy policies associated with the at least one application, wherein the association includes social network relationships between the user and the one or more other users;
process one or more predetermined thresholds with respect to one or more violations satisfying a contextual parameter of the online social interactions, to determine that the one or more predetermined thresholds have been reached, wherein the contextual parameter of the social interactions include frequencies of the online social interactions;
when the one or more predetermined thresholds has been reached, generate a report, including entries indicating the one or more violations of the contextual parameter, as an alert to signify non-compliance with the one or more privacy policies;
present the report and the one or more adaptations on a user interface;
in response to a user approval of the one or more adaptations, automatically adapt the one or more privacy policies into one or more adapted privacy policies; and apply the one or more adapted privacy policies by restricting data access by or via the at least one application, blocking access to the at least one application, or a combination thereof.

10. An apparatus of claim 9, wherein the apparatus is further caused to:
determine a specification of the one or more privacy policies as one or more restrictive privacy policies; and
determine the one or more adaptations for causing, at least in part, a relaxing of the one or more restrictive privacy policies.

11. An apparatus of claim 9, wherein the apparatus is further caused to:
determine a specification of the one or more privacy policies as one or more relaxed privacy policies; and
determine the one or more adaptations for causing, at least in part, a restricting of the one or more relaxed privacy policies.

12. An apparatus of claim 9, wherein the apparatus is further caused to:
determine the user contextual information, the user application use information, or a combination thereof in real-time or substantially real-time.

13. An apparatus of claim 9, wherein the one or more adaptations are, at least in part, suggestions to adjust the one or more privacy policies based, at least in part, on the policy compliance profiles, the user profile, the user contextual information, or a combination thereof.

14. An apparatus of claim 9, wherein the apparatus is further caused to:
determine one or more context features, one or more user profiles, or a combination thereof from the user contextual information, the user application use information, or a combination thereof,
wherein the determining of the one or more adaptations is based, at least in part, on the one or more context features, the one or more user profile, or a combination thereof.

15. An apparatus of claim 9, wherein the apparatus is further caused to:
process the user contextual information, the user application use information, or a combination thereof against the association, the one or more policy compliance profiles, the one or more contexts, or a combination thereof to determine one or more anomalies, one or more exceptions, or a combination thereof,
wherein the determining of the one or more adaptations is based, at least in part, on the one or more anomalies, the one or more exceptions, or a combination thereof, and
wherein the one or more policy compliance profiles include, at least in part, one or more access frequencies, one or more access time intervals, one or more access data object levels, one or more access data context categories, or a combination thereof.

16. An apparatus of claim 9, wherein the online social interactions include game playing, weight-watching, personal training, travel planning, social networking, dating, or a combination thereof between the user and the one or more other users via the at least one application.

\* \* \* \* \*